United States Patent [19]

Gebauer et al.

[11] 4,278,769
[45] Jul. 14, 1981

[54] BLOWING AGENT CONCENTRATE

[75] Inventors: Peter Gebauer, Troisdorf; Karl G. Sturm, St. Augustin, both of Fed. Rep. of Germany

[73] Assignee: Dynamit Nobel AG, Cologne, Fed. Rep. of Germany

[21] Appl. No.: 13,761

[22] Filed: Feb. 21, 1979

Related U.S. Application Data

[63] Continuation of Ser. No. 774,095, Mar. 3, 1977, abandoned.

[30] Foreign Application Priority Data

Mar. 4, 1976 [DE] Fed. Rep. of Germany ....... 2608925

[51] Int. Cl.$^3$ ................................................ C08J 9/00
[52] U.S. Cl. ........................................ 521/90; 521/79; 521/81; 521/91; 521/122; 521/128; 521/138; 521/182
[58] Field of Search .................... 521/182, 90, 122, 91

[56] References Cited

U.S. PATENT DOCUMENTS

| 2,945,828 | 7/1960 | Henning | 260/2.5 HA |
|---|---|---|---|
| 3,198,859 | 8/1965 | Tomlinson | 264/55 |
| 3,511,788 | 5/1970 | Keil | 260/2.5 P |
| 3,634,564 | 1/1972 | O'Kamoto et al. | 260/2.5 E |
| 3,725,321 | 4/1973 | Wirth et al. | 260/2.5 W |
| 3,876,566 | 4/1975 | Koshak et al. | 260/2.5 HA |
| 3,936,400 | 2/1976 | Wambach | 260/2.5 N |
| 3,962,154 | 6/1976 | Egli | 260/2.5 HA |
| 3,965,053 | 6/1976 | Kleiner et al. | 260/2.5 HA |
| 4,002,581 | 1/1977 | Dolce | 260/2.5 N |
| 4,097,421 | 6/1978 | Chang | 521/182 |

*Primary Examiner*—Morton Foelak
*Attorney, Agent, or Firm*—Sprung, Felfe, Horn, Lynch & Kramer

[57] ABSTRACT

A blowing agent concentrate comprising a chemical blowing agent and a thermoplastic composition vehicle therefore, said thermoplastic composition being a saturated polyester and/or copolyester having a crystalline melting point between 100° C. and 220° C. and a reduced viscosity of 0.4 dl/g to 1.6 dl/g; the use of such blowing agent concentrate in the formation of foamed articles of high molecular weight polyalkyleneterephthalate which articles can be filled and/or reinforced and/or flame proofed and can contain other additives. Particularly contemplated is the use of such blowing agent concentrate in the formation of glass fiber reinforced structural foam moldings of polyalkyleneterephthalates especially polytetramethylene terephthalates.

37 Claims, No Drawings

BLOWING AGENT CONCENTRATE

This is a continuation of application Ser. No. 774,095, filed Mar. 3, 1977, now abandoned.

BACKGROUND OF THE INVENTION

1. Field of the Invention

This invention relates to a blowing agent concentrate comprising a chemical blowing agent and a thermoplastic vehicle therefor. More especially this invention relates to a blowing agent concentrate for use together with polyalkyleneterephthalates of high molecular weight to form structural foam products of such polyalkyleneterephthalates. This invention is especially concerned with blowing agent concentrates comprising a chemical blowing agent and a thermoplastic vehicle therefor, said thermoplastic vehicle being a polyester and/or copolyester having a crystalline melting point between 100° C. and 220° C. and a reduced viscosity between 0.4 dl/g and 1.6 dl/g.

2. Discussion of the Prior Art

Several methods are known for the incorporation of chemical blowing agents into the thermoplastic composition that is to be foamed. For example, the usually powdered blowing agent can be dusted onto the plastic granules in the required concentration of 0.1 to 5.0% by weight, as a rule, depending on the activity of the blowing agent. This method is still used widely, but it has a number of decided disadvantages. During the mixing procedure, dust is raised, sometimes to a considerable extent. This dust results in a contamination of the mixing units and of the surrounding area, and is furthermore harmful to health in some cases. Furthermore, and especially in the case of the addition of large amounts, separation and settling of ingredients can occur. The fluctuating contant of the blowing agent that results militates against uniform quality in the products made from such mixtures. In the case of conveyor transportation, settling and losses of the blowing agent occur. Pneumatic conveying over relatively long distances is almost impossible. In fabrication, settling and irregular distribution of powdered chemical blowing agents can take place in the supply hopper of the fabricating machine, resulting in quality variations. In the area of the machine where the materials are fed in, when the decomposition temperature of the blowing agent is exceeded, blowing gas losses can be produced by loss through the feed opening, which quite considerably limits the blowing gas yield.

For the avoidance of these disadvantages, provision has been made (cf., e.g., German "Offenlegungsschrift" No. 2,434,085) for incorporating the blowing agent powder directly into the plastic to be foamed. The blowing agent that is used is, in this process, first incorporated into the melt of the polymer at a rate which is in a fixed ratio to the polymer, and is an integral component of the granules produced. During fabrication to structural parts, the blowing agent contained in the granules is activated and permits the formation of the structural foam product. In this method of incorporating the blowing agent it is highly disadvantageous that a partial decomposition of the blowing agent takes place during the production of the granules containing it, since the fabrication temperature required for the achievement of a homogeneous melt is so close to the composition temperature of the blowing agent, depending on the blowing agent used, that the latter yields gas before the fabrication process begins, and therefore its further effect is greatly limited. The consequences are variations of density in the foam structure. In many cases, the blowing pressure, reduced by the premature gas losses, is no longer sufficient for a perfect formation of the structural foam piece. Another deficiency of this method is that such blowing-agent-containing plastics require a larger inventory, since batches with different blowing agent contents have to be prepared which are adapted to the flowing characteristics of the plastic to be foamed and to the dimensions of the moldings that are to be produced.

For the avoidance of these disadvantages, the blowing agent has been incorporated in concentrated form into a polymer which is to be prepared in the plastic state at a temperature below its decomposition temperature, and the mixture is blended with the plastic to be foamed, in the necessary ratio. In this manner the disadvantages which occur in the handling of powdered blowing agents are avoided. The preparation and stocking of a plurality of batches of different blowing agent contents is not necessary, since the desired blowing agent contents can be matched to the particular requirements immediately prior to the actual foaming process by varying the ratio of admixture of the blowing agent concentrate with the polymer that is to be foamed.

Blowing agent concentrates on the basis of polystyrene and polyolefins are known. These blowing agent concentrates, however, have the deficiency that they are not suitable for the manufacture of structural foam products from polyalkylene terephthalates of high molecular weight. When such blowing agent concentrates are used in conjunction with polyalkylene terephthalates, fabricated products are obtained which have reduced physical, mechanical and thermal characteristics. For this reason it has hitherto been considered advisable, for the production of structural foam products from polyalkylene terephthalates, to use the above-described disadvantageous methods for the incorporation of the blowing agent.

SUMMARY OF THE INVENTION

It is an object of this invention to provide a foamable blowing agent concentrate compatible with polyalkyleneterephthalates wherein migration of the blowing agent from the concentrate does not occur. It is a further object of this invention to provide a blowing agent concentrate for use with high molecular weight polyalkyleneterephthalates whereby foam fabricated products thereof can be made without impairing the physical, mechanical or thermal characteristics thereof. It is a further object of the invention to provide a blowing agent concentrate for use in the formation of structural foam products of polyalkyleneterephthalates of high molecular weight wherein the blowing agent is not prematurely activated during the premixing of the blowing agent and the polyalkyleneterephthalate. These and other objects of this invention will become apparent from the ensuing disclosure.

Broadly this invention contemplates a blowing agent concentrate comprising a chemical blowing agent and a thermoplastic composition as a vehicle therefore, said thermoplastic composition being a saturated polyester and/or copolyester having a crystalline melting point between 100° C. and 220° C. and having a reduced viscosity between 0.4 dl/g and 1.6 dl/g. The molecular weight of these polyester and/or copolyester vehicles is between 10,500 and 48,000 determined by calculation: (1) and (2).

$$M_n^{0.78} = 3920 \times [\eta] \quad M_n = 39750 \times [\eta]^{1.28} \quad (1)$$

$$[\eta] = \frac{\sqrt{1 + 1.4\eta 1 \cdot 2} - 1}{0.7} \quad (2)$$

It has been discovered that by employing a chemical blowing agent based upon a saturated polyester or copolyester of crystalline melting point between 140° C. and 220° C. and reduced viscosity of 0.4 dl/g and 1.6 dl/g that the aforementioned deficiencies with prior art procedures are eliminated.

The polyesters and copolyesters of the invention have glass transition temperatures between −20° and +50° C., preferably −10° to +20° C. The glass transition temperatures are measured in accordance with DIN 53445 by torsional vibration analysis as the maximum of the logarithmic decrement of the mechanical damping. The level of the logarithmic decrement of the mechanical damping ranges from 0.2 to 1.3. The crystalline melting points are measured by the differential thermoanalysis method as the melting maximum. In the differential thermoanalysis method, the differential scanning calorimeter model DSC-1 made by Perkin-Elmer is used, a heating rate of 16° C./min being applied.

The reduced viscosity $\eta_{red.}$ is measured in a solution of 1 percent by weight in a mixture of 60 weight-parts of phenol and 40 weight-parts of 1,1,2,2-tetrachloroethane at 25° C., and is calculated by the following formula:

$$\eta_{red.} = \frac{\frac{t_L}{t_{Lm}} - 1}{c} \quad [dl/g]$$

$T_L$ representing the pouring time of the solution, $t_{Lm}$ the pouring time of the solvent, and c the concentration in grams per 100 ml.

Those polyesters or copolyesters which have crystallite melting points of 110° to 200° C. are preferred in accordance with the invention. The preferred reduced viscosity is 0.7 dl/g to 1.0 dl/g.

The polyesters and copolyesters used in accordance with the invention as vehicles for the blowing agent are derived with regard to their acid component wholly or to more than 50 mole-% from terephthalic acid or its polyester forming derivatives. The co-acids to make 100 mole-% are one or more other aromatic and/or saturated aliphatic dicarboxylic acids having 2 to 12 carbon atoms between the functional groups, or their polyester-forming derivatives. With regard to the diol component, the polyesters or copolyesters are derived from one or more saturated aliphatic glycols of 2 to 12 carbon atoms.

Suitable co-acids are, for example, sebacic acid, azelaic acid, succinic acid, glutaric acid, adipic acid, isophthalic acid or cyclohexanedicarboxylic acid or their polyester-forming derivatives. If, in the case of the copolyesters, only terephthalic acid or its polyester-forming derivatives are used as the dicarboxylic acid, at least two diols are used as the diol component. The co-acids are used—together with terephthalic acid—perferably in amounts of 10 to 40 mole-%.

Isophthalic acid and/or adipic acid, or in some cases their dialkyl esters, are preferred as co-acids. They can be replaced wholly or partially, if desired, by at least one aliphatic saturated dicarboxylic acid or its polyester-forming derivative, examples being sebacic acid, azelaic acid, succinic acid, glutaric acid or cyclohexanedicarboxylic acid or the like, preferably azelaic or sebacic acid or mixtures thereof.

The polyester-forming derivatives of the dicarboxylic acids are primarily the monoalkyl or dialkyl esters, especially the dimethyl esters.

Examples of suitable diols or co-diols are the following: ethylene glycol, propanediol-1,2, propanediol-1,3, butanediol-1,3, butanediol-1,4, pentanediol-1,5, neopentyl glycol, hexanediol-1,6, octanediol-1,8, cyclohexanedimethanol and the like, or mixtures of the individual components. Butanediol-1,4, and Hexandiol 1,6, is preferred in accordance with the invention as the diol or co-diol, as the case may be, for the copolyesters.

In the case of a preferred embodiment of the copolyesters used as vehicle, they are derived with regard to the acid component from 90 to 50 mole-% of terephthalic acid or its polyester-forming derivatives, preferably its dialkyl esters, especially its dimethyl esters, and 10 to 50 mole-% of one or more of the above-named co-acids. In this preferentially used copolyester, butanediol-1,4 is used as the diol component. If desired, as much as 10 mole-% of the butanediol-1,4 can be replaced by another or by several other diols of up to 12 carbon atoms. Examples of suitable diols are ethylene glycol or propanediol-1,2 or propanediol-1,3 or butanediol-1,3 or pentanediol-1,5 or neopentyl glycol or hexanediol-1,6 or octanediol-1,8 or cyclohexanedimethanol or mixtures of the individual components. Ethylene glycol or hexanediol-1,6 is used preferentially as the co-diol for butanediol. In the case of hexanediol 1,6 up to 50% of the butanediol 1,4 may be replaced by the hexanediol 1.6.

When butanediol-1,4 is used as the sole diol component, those copolyesters have proven to be especially suitable which are derived as regards the acid component from 60 to 85 mole-% of terephthalic acid or its polyester-forming derivatives and from 15 to 40 mole-% of isophthalic acid or its polyester forming derivatives, the isophthalic acid being replaceable wholly or partially by an aliphatic dicarboxylic acid, such as azelaic acid and/or adipic acid and/or sebacic acid, preferably by adipic acid.

In accordance with the invention, copolyesters which are derived with regard to the acid component from 70 to 80 mole-% of terephthalic acid or its polyester-forming derivatives, 20 to 30 mole-% of one or more other aromatic and/or one or more aliphatic saturated co-acids having two to twelve carbon atoms between the two functional groups, and with regard to the diol component from ethylene glycol, up to 10 mole-% of the ethylene glycol being replaced, if desired, by one or more diols of 3 to 12 carbon atoms.

A copolyester is cited as especially well suited as a vehicle for the purpose of the invention, which is derived with regard to the acid component from 65 to 75 mole-% of terephthalic acid or its dimethyl esters and 25 to 35 mole-% of adipic acid, and with regard to the diol component from butanediol-1,4.

Another copolyester which is well suited as a vehicle is derived with regard to the acid component from 85 mol-% terephthalic acid or its dimethylesters and from 45 mol-% isophthalic acid or it's dimethylesters and with regard to the diol-components from 50% butanediol 1,4 and 50% hexanediol 1,6.

In addition to copolyesters, several special polyesters which have a crystalline melting point between 100° and 200° C. and a reduced viscosity between 0.4 dl/g and 1.6 dl/g can be used. An example of such a suitable polyester is one which is derived, with respect to its acid compound, from terephthalic acid or its polyester-forming derivative, preferable its dimethyl ester, and, with respect to its diol coponent, from hexanediol-1,6.

The preparation of the polyesters or copolyesters used as vehicles for the blowing agent, in accordance with the invention, is not subject matter of the present invention. They can be prepared in a conventional manner, e.g., by a method analogous to the preparation of polyethelene.

For example, in an autoclave equipped with a stirrer, dimethyl terephthalate and dimethyl isophthalate in the above-given molar ratio are transesterified with excess butanediol-1,4 in the presence of a transesterification catalyst, such as tetra-n-butyltitanate and, if desired, zinc acetate dihydrate. At an internal temperature of about 150° to 220° C., the methanol is distilled out, preferably under normal pressure, and then the co-acid, e.g., sebacic acid, is added. For the esterification of the sebacic acid, the temperature is raised to 250° C. and the reaction mixture is left for about 2 hours at this temperature. The completeness of the esterification is controlled by measuring the amount of reaction water that passes over. After injection of triphenyl phosphite with a small amount of diol (to inhibit the transesterification catalyst), the autoclave is evacuated and the internal temperature is raised to 260° C. Over a period of one hour, the internal temperature is then increased to 270° C. and immediately the pressure is reduced to less than 1 Torr. After 3 to 4 hours of stirring under the last-named conditions, the vacuum is broken by the introduction of nitrogen, the copolyester obtained is removed through the drain valve, and is granulated.

The preparation of the blowing agent concentration of the invention is performed by mixing the saturated polyester or copolyester that is used, which is in the form of granules or powder, with the chemical blowing agent, e.g., a powdered chemical blowing agent, and, if desired, with additional additives, initially at room temperature. This mixture is then homogenized in an extruder or kneader through the molten phase of the polyester or copolyester, as the case may be, and is extruded through a die. The polyester or copolyester used as the vehicle, and the blowing agent, can also be introduced into the apparatus serving for the homogenization separately from one another in the desired ratio by means of suitable proportioning devices. If desired, the blowing agent can also be added to the vehicle material while the latter is in the molten state. The comminution of the solidified concentrate mixture to granules of the size required for later fabrication is accomplished in a known manner, e.g., immediately after extrusion from the die, after it has sufficiently cooled, by means of granulators or mills, or it can be done at a later time. Basically, the size and shape of the granules of blowing agent concentrate can be as desired, but it is desirable, for the avoidance of separation, to adapt the shape and size of the blowing agent concentrate to that of the polyalkylene terephthalate which is to be foamed.

Those blowing agent concentrates are used in accordance with the invention which have a blowing agent content of 1 to 50 wt.-%, preferably 2 to 30 wt.%, and especially 5 to 20 wt.-%.

Chemical blowing agents are used as blowing agent in accordance with the invention. Characteristic of the chemical blowing agents is their spontaneous decomposition above a temperature that is characteristic for the particular compound—the so-called start-up temperature. The start-up temperature depends on the chemical structure of the blowing agent used. The selection of the blowing agent for the blowing agent concentrate of the invention is governed mainly by the melting temperature or fabrication temperature of the vehicle material, i.e., the blowing agents must not become activated during the preparation of the concentrate. Furthermore, the blowing agent must be compatible both with the vehicle and with the plastic to be foamed, and must have a sufficient activity.

Suitable blowing agents for the foaming of thermoplastic compositions are, for example, the decomposable-group-containing azo compounds, hydrazines, semicarbazides, triazoles, tetrazoles and N-nitroso compounds (cf. H. Hurnik, "Treibmittel für Kunststoffschäume", Kunststoffe 62, 1972, vol. 10, pages 687–689).

The blowing agent concentrates of the invention are especially suitable in accordance with the invention as gas-yielding components in the manufacture of structural foam products from polyalkylene terephthalates of high molecular weight, such as, for example, polyethylene terephthalate, poly-(1,3-propylene)-terephthalate, and especially poly-(1,4-butylene)-terephthalate. For the production of structural foam moldings of good mechanical, physical and thermal characteristics, polyalkylene terephthalates are generally used which have reduced viscosities of approximately 0.7 to 2.3. dl/g Polytetramethylene terephthalate is generally fabricated, when the mechanical characteristic requirements are high, with reduced viscosities of 0.7 to 2.0, dl/g preferably 0.8 to 1.6. dl/g When the mechanical characteristic requirements are lower, polyalkylene terephthalates of lower reduced viscosities of, for example, 0.4 to 0.7, dl/g can be used. Generally speaking, the molecular weight of these polyalkylene terephthalates is between 20,000 and 59,000, preferably between 23,500 and 49,000, determined by calculation:

$$M_n^{0,78} = 3920 \times [\eta] \quad M_n = 39.900 \times [\eta]^{1,28}.$$

$$[\eta] = \frac{\sqrt{1 + 1,4 \, \eta\text{red.}} - 1}{0,7}$$

The production of the linear polyalkylene terephthalates for foaming is not subject matter of the invention. They can be prepared in a known manner—for example by the method described above. If desired, the melt condensation, in the case, for example, of the production of polytetramethylene terephthalates of high molecular weight, is stopped at reduced viscosities of 0.9 to 1.0 dl/g and the further condensation is performed in the solid phase (see, for example, German "Offenlegungsschrift" No. 2,315,272).

For the foaming of polyalkylene terephthalates for which the blowing agent concentrates of the invention are used preferentially, all chemical substances suitable for the foaming of thermoplastic compositions are fundamentally suitable, provided they are not activated during the preparation of the concentrate, and provided they are compatible with the blowing agent vehicle that is used and with the polyalkylene terephthalates to be foamed.

For the purpose of the invention, blowing agents are suitable which have decomposition temperatures ranging from 120° to 260° C., preferably 200° to 260° C., the blowing agent-vehicle combination being so coordinated that the blowing agent is not activated during the preparation of the concentrate. The following are given as examples of blowing agents having decomposition temperatures of 200° to 260° C.: trihydrazinotriazine, p-toluylenesulfonyl semicarbazide, 4,4'-hydroxy-bis-(benzenesulfonylsemicarbazide), barium azodicarboxylate, a number of tetrazoles and hydrazine derivatives.

Other blowing agents which can be used in the blowing agent concentrate of the invention include in particular:

modified azodicarbonamides benzooxafines, e.g. is to acid anhydride carboxylic acid-carbonic acid-anhydride, e.g. isophthalic acid-carbonic acid ethylester-anhydride or bisbenzoe acid-biscarbonic-acid-1,4 butanediolester anhydride mixtures from carboxylic acids and carbonates, e.g. or mixture of citric acid and sodium hydrogen carbonate.

The foaming method that is to be used also plays a certain part in the selection of the chemical blowing agent, and therefore it is desirable to use blowing agents which are adapted to the particular foaming method.

For example, for the foaming of the polyalkylene terephthalates which are used preferentially in accordance with the invention, in conventional injection molding machines, such as screw piston injection molding machines, which are also used for the manufacture of solid injection moldings, those blowing agents are preferably used whose activation or decomposition temperature, as the case may be, is lower than, and preferably slightly lower than, the fabricating temperature required for polyalkylene terephthalate molding compositions. By the term "fabricating temperature", as used herein, is meant the mass temperature which establishes itself when a temperature schedule is used which is adapted especially to the combination of polyalkylene terephthalate and blowing agent concentrate which is to be foamed. For example, in the foaming of polytetramethylene terephthalate (melting point 225° C.), a temperature schedule is used in which the temperature rises from the infeed zone to the nozzle, e.g., Zone 1 (infeed zone,: 230° C., Zone 2: 250° C., Zone 3 (cylinder discharge): 270° C., nozzle: 280° C. With this temperature schedule, an average mass temperature of about 260° C. establishes itself.

In this case, a blowing agent is preferably used which has activation temperatures ranging from less than 230° C. to 250° C., preferably 240° to 250° C.

However, the same blowing agents can also be used with good success in the foaming of other polyalkylene terephthalates, such as, for example, polyethylene terephthalate (melting point 260° C.), in whose fabrication it is desirable to use a temperature schedule in which a mass temperature of about 280° C. will establish itself. (E.g., Zone 1: 250° C., Zone 2: 270° C., Zone 3: 285° C., nozzle: 295° C.)

The blowing agents preferably used in the foaming of polyethylene terephthalate of high molecular weight, and especially polytetramethylene terephthalate, are 5-phenyltetrazol and 5-phthalimidotetrazol.

Basically, however, other blowing agents can also be used, provided that they comply with the above-stated requirements with regard to compatibility and with regard to non-activation in the preparation of the concentrate, while at the same time assuring a good foaming by the various methods for the preparation of structural foam products.

The blowing agent concentrates of the invention can be used as gas-yielding components in all processes for the production of structural foam products from polyalkylene terephthalate molding compositions. Their preparation can be accomplished in extruders and injection molding machines designed for the production of solid moldings and on special machines designed for the fabrication of thermoplastics containing blowing agents. The injection molding and extrusive methods and the blowing of thermoplastics containing blowing agents in molds are extensively described in the literature (cf. "Integralschaumstoffe", Piechota/Röhr, Carl Hanser-Verlag 1975, pages 91 to 142).

The blowing agent concentrates of the invention are used preferentially in the production of structural foam products by the thermoplastic foam injection molding process which is described on pages 94 to 125 of the above citation from the literature. The can be used as the gas-yielding component both in the production of specifically heavier pieces and of specifically light pieces.

The term "structural foam moldings", as used herein, refers to foam moldings having a virtually solid external skin and a foamed core. Such structural foam moldings are produced by the fact that, when the decomposition temperature of the chemical blowing agent is exceeded, the released gas, which is nitrogen or carbon dioxide as a rule, is at first held in solution under pressure in the plastic melt, and then, in the molding process, the molten plastic is foamed by the expansion pressure and forced against the mold walls.

In the production of the structural foam moldings from polyalkylene terephthalate molding compositions with the use of the blowing agent concentrates of the invention, the polyalkylene terephthalate granules and the granules of the blowing agent concentrate are mixed together in suitable mixing apparatus. The quantity ratio is goverened by the amount of blowing agent required for the molding being produced and by the activity of the blowing agent. In general, the blowing agent concentrate is added in such an amount that the blowing agent content of the complete mixture amounts to from 0.05 to about 10.0 wt.-%, preferably 0.4 to 5.0 wt.-%. Depending on the concentration of the blowing agent in the concentrate from 1 to 50 wt.-%, preferably 2 to 30 wt.-%, and especially 5 to 20 wt.-% of blowing agent concentrate is added to the plastic to be foamed, with respect to the total mixture. After the mixing process, the mixture is delivered to the material supply hopper of the fabricating machine and fabricated into structural foam moldings.

By means of the blowing agent concentrates of the invention, filled and/or reinforced and/or flameproofed structural foam moldings containing other additives if desired, such as light stabilizers, dyes, pigments, nucleating agents such as talcum, or pore regulators such as finely divided metal powders for example, can be made from polyalkylene terephthalates, preferably from polytetramethylene terephthalate.

Reinforcing agents are, for example, glass powder, glass spheres, glass fibers, asbestos fibers and the like, which have been treated, if desired, with appropriate dressings or adhesivizing agents (see, for example, German Offenlegungsschrift No. 2,426,656).

Glass fibers are preferred as reinforcing substances, these being best used in such an amount that the glass fiber content of the foamed molding amounts to from 2 to 60 weight-percent, preferably 10 to 50 weight-percent.

Surprisingly, the addition of glass fibers results in the production of an especially uniform, finely cellular pore structure and a uniform, optically perfect surface on the foamed moldings.

In another advantageous embodiment of the invention the blowing agent concentrates of the invention are used as gas-yielding components in the production of glass fiber-reinforced structural foam moldings, which can be flameproofed if desired, from polyalkylene terephthalate, especially polytetramethylene terephthalate.

If desired, the above-mentioned additives, especially the nucleating agents, pore regulators, dyes, pigments, light stabilizers and the like can be contained in the blowing agent concentrate used in accordance with the invention, or in the polyalkylene terephthalate, in the necessary amount.

Fundamentally however, the additives, in the form of dye concentrates, filler or reinforcing concentrates, stabilizer concentrates, flameproofing concentrates, nucleating agent and pore regulator concentrates and the like, can be mixed in the necessary quantity ratio with the blowing agent concentrate and the polyalkylene terephthalate, and this mixture of granules can be introduced into the foaming apparatus. Suitable vehicular substances for the additives are those thermoplastics which are compatible both with the blowing agent concentrate vehicle and with the polyalkylene terephthalate that is to be foamed. Preferably, the same vehicle is used for the additives that is used for the blowing agent concentrate.

Suitable flameproofing agents are halogen-containing compounds, especially bromine-containing compounds, whose flame-retardant action can be improved, if necessary, by the addition of synergists, such as elements from the 5th Group of the Periodic System—antimony trioxide, for example.

Preferably those flameproofing agents are used whose melting points are above the working temperature of the thermoplastics used as the vehicle for the flameproofing concentrate. Examples are octabromodiphenyl, decabromodiphenyl, decabromodiphenylether, cross-linked polytetrabromoxylyleneglycolbisacrylate, and the like.

Flameproofing concentrates with a content of more than 50 wt.-%, preferably 70 to 90 wt.-%, of flameproofing agent are preferred.

The flameproofing concentrates can be produced by methods analogous to those used in preparing the blowing agent concentrates. For example, a mixture of 29 weight-parts of antimony trioxide, 58 weight-parts of octabromodiphenyl and 13 weight-parts of a suitable thermoplastic, prepared for example from 30 wt.-parts of adipic acid, 70 wt.-parts of terephthalic acid and butanediol-1,4, is homogenized in a double screw extruding machine having a compression zone in the front end. From the nozzle there emerges a solid strand which can be chopped directly at the nozzle into granules of the desired size.

The flameproofing concentrates are added to the polyalkylene terephthalate to be foamed, or to the mixture to be foamed, preferably in such an amount that the total mixture contains about 4 to 10 wt.-% of halogen, preferably bromine. For example, 17 weight-parts of the abovenamed flameproofing agent concentrate on the basis of octabromodiphenyl, antimony trioxide and copolyester are mixed with 83 weight-parts of a mixture of PTMT and blowing agent concentrate (weight ratio 19:1, blowing agent content of the concentrate 10% by weight) and then foamed. Similar methods can be used in the production of glass fiber-reinforced, flameproofed structural foam moldings.

By the use of the blowing agent concentrates of the invention the production of structural foam moldings from polyalkyleneterephthalates is substantially simplified and improved. The disadvantages resulting from the direct addition of blowing agents in powder form are avoided, and the disadvantages encountered in the fabrication of polyalkylene terephthalate granules containing blowing agents are eliminated. Decided advantages are achieved in comparison with the blowing agent concentrates known hitherto. On the basis of their compatibility with the polyalkylene terephthalate molding compositions to be foamed, one can produce moldings having good physical, mechanical and thermal characteristics.

In the polyesters and copolyesters used as vehicles in accordance with the invention, vehicles are made available which are particularly well suited for the foaming especially of polyalkylene terephthalate molding compositions. On the basis of the good flow characteristics of the mixture to be foamed, one can produce moldings of complicated shape having optically perfect and smooth surfaces.

It is especially advantageous that the cycle time in the shaping of the polyalkylene terephthalate molding compositions, especially in the case of fabrication on screw piston injection molding machines, by the foam injection molding process for example, is lengthened virtually not at all. Another advantage that can be cited is that the thermal stability of the molten vehicle substance is maintained at the high working temperatures required for linear polyalkylene terephthalates of high molecular weight. Thus, the discoloration of the polyalkylene terephthalate molding compositions by the thermal decomposition of the vehicle is prevented.

In order to more fully illustrate the nature of the invention and the manner of practicing the same the following examples are presented. In these examples comparative examples are shown by which it can be seen that superior products are provided by the use of the blowing agent concentrate of this invention in the standard methods for preparing foamed structural articles.

EXAMPLES

Comparative Example 1

Granulated cylindrical strands of polytetramethylene terephthalate, reinforced with 30 wt.-of glass fibers and having a specific weight of 1.52 g/cm$^3$ at a reduced specific viscosity of the polymer of 1.0 dl/g, and a bulk weight of 660 grams per liter, were mixed with 0.5 wt.-% of powdered 5-phenyltetrazol serving as a chemical blowing agent, in a slow-running mixer (Papenmeier type). In the initial phase of the mixing process, a large amount of dust was produced. The time required to achieve a uniform distribution of the blowing agent powder was 5 minutes. This mixture was dumped into a supply hopper of sheet steel and fed to the input hopper of a solid injection molding machine. The walls of the mixer and of the supply hopper bore thick residues of blowing agent powder after they had been emptied.

The injection molding machine was a screw piston machine Model 150-600 made by Krauss-Maffei, with a screw diameter D of 40 mm and a screw length of 20×D. At cylinder temperatures (from the input to the nozzle) of 230°, 250°, 270°, 280° C., resulting in a mass temperature of 260° C., and a mold temperature of 50° C., structural foam boards were molded, which measured 210×140×10 mm. The cooling time to the stripping of the boards from the mold was 150 seconds. After that, large amounts of blowing agent residue were found in the input hopper of the injection molding machine. During the molding operation, demixing phenomena occurred in the hopper, evidencing separation of the blowing agent from the polytetramethylene terephthalate granules. The specific weight of the boards was 1.05 grams per cm$^3$. The mechanical characteristics for Comparative Examples 1 to 3 and for Example 1 are listed in Table 2. The judgment of the quality characteristics is to be found in Table 1.

Comparative Example 2

In a Reifenhauser Model R-30 single-screw extruding machine having a screw diameter D of 30 mm and a screw length of 20×D, a mixture of 69.5 wt.-% of unreinforced polytetramethylene terephthalate granules, 30 wt.-% of 6 mm staple glass fibers and 0.5 wt.-% of 5-phenyltetrazol were processed and homogenized in the molten phase, and extruded through a 4 mm round die to form a strand which was chopped into cylindrical granules. The extruder cylinder temperatures were 220° to 240° C., and the screw speed was 90 rpm. The bulk weight of the granules was 480 g/l, the reduced viscosity of the PTMT was 1.0 dl/g. In comparison with the granules from Comparative Example 1, the bulk weight was lower by 180 g/l. The cause of this difference was a partial decomposition of the blowing agent which took place during the production of the granules, and which could not be avoided despite the already relatively low cylinder temperatures. When the cylinder temperatures were reduced still further by way of experiment, the melt cooled below the 225° C. melting point and solidified, so that extrusion was impossible. This premature decomposition reduced the active amount of blowing agent contained in the granules, and thus its activity in the foaming process was limited. The granules were injection-molded under the same conditions described in Comparative Example 1, to form structural foam boards 10 mm thick. The specific weight of the boards was 1.1 g/cm$^3$.

Comparative Example 3

The same glass fiber reinforced polytetramethylene terephthalate granules as described in Comparative Example 1 were mixed in a slowly running mixer in a ratio of 39:1 with a commercial granulated blowing agent concentrate on a polystyrene basis containing 20 wt.-% of a chemical blowing agent, so that the final concentration of the blowing agent in the total mixture was 0.5 wt.-%. This mixture was injection-molded as described in Comparative Examples 1 and 2 to form 10 mm thick structural foam boards having a specific weight of 1.0 g/cm$^3$. The cooling time in this case had to be lengthened to 200 seconds, since if the cooling time was shorter, the boards did not have sufficient stability of shape, and after-blowing phenomena occurred. During the molding operation an unpleasant odor developed in the feed hopper and at the nozzle of the injection molding machine. The boards had a rough, variously colored surface shot through with heavy inhomogeneities. These phenomena point to an incompatibility of the concentrate vehicle with polytetramethylene terephthalate.

Example 1

A granulated, crystalline copolyester on the basis of 70 mole-% of terephthalic acid, 30 mole-% of adipic acid and butanediol-1,4, which had a reduced viscosity of 0.81 dl/g, a melting maximum in the differential thermoanalysis (DTA) process of 183° C. and a maximum logarithmic damping decrement of 0.55 at a glass transition temperature $Tg_{dyn}$ of $-1°$ C. (determined in the torsional vibration test in accordance with DIN 53445), was made into the blowing agent concentrate of the invention by the addition of 10 wt.-% of powdered 5-phenyltetrazol in the single-screw extruding machine described in Comparative Example 2. The delivery of the material to the feed hopper of the extruding machine was performed by delivering the copolyester and blowing agent on separate proportioning belt scales in a ratio of 90:10. These components were homogenized in the molten phase at a mass temperature of 195° C. and a screw speed of 30 rpm, extruded in strand form through a 4 mm round die, cooled on an air-cooled conveyor belt, and granulated in a granulator.

The bulk weight of the granules was 600 g/l. The initial bulk weight of the copolyester granulate used as the concentrate vehicle also amounted to 600 g/l. Premature foaming of the concentrate granules by partial decomposition of the blowing agent did not occur, since during the preparation of the concentrate the mass temperature could be kept far below the melting and decomposition temperature of the blowing agent used.

The blowing agent concentrate prepared in this manner was mixed in a 19:1 weight ratio (final concentration of the blowing agent in the total mixture 0.5 wt.-%) in a slow-running mixer (see Comparative Example 1). After a mixing time of only 1.5 minutes a homogeneous mixture was achieved. No residues of any kind formed in the mixer.

This mixture was injection molded under the conditions specified in Comparative Examples 1 to 3 in the same injection molding machine, to form structural foam boards 10 mm thick; the cooling time of 150 seconds was sufficient. The specific weight of the boards amounted to 1.0 grams per cubic centimeter.

In contrast to the boards from Comparative Examples 1 to 3, these boards had an especially smooth and uniform surface; structures were hardly detectable; the natural color was unaltered and corresponded in tone to the boards from Comparative Examples 1 and 2.

With a starting amount of 0.5 wt.-% of the same blowing agent, which was identical to that used in Comparative Examples 1 and 2, a plainly higher effectiveness was found in theblowing agent concentrate of the invention. Whereas with this concentrate a minimum specific weight of 0.8 g/cm$^3$ was achieved with this concentrate in the production of boards on the solid injection molding machine used (the minimum specific weight is achieved when the mold is just barely filled up at the minimum possible input of the composition), a sufficient filling of the mold could not be achieved with compositions of Comparative Examples 1 and 2, at the same machine setting and material input. The minimum achievable density was 0.95 g/cm$^3$ with compositions of Comparative Example 1, and 1.05 g/cm³ with compositions of Comparative Example 2. Due to the fixed blowing agent content of the molding composition from Comparative Example 2 it was not possible to achieve lower densities by increasing the blowing agent content.

In contrast to Comparative Examples 1 to 3, the use of the blowing agent concentrate of the invention resulted in an especially fine-celled and uniform pore structure. This effectively enhances the nucleating action already produced by the addition of the glass fibers.

Example 2

A mixture was prepared from glass fiber-reinforced polytetramethylene terephthalate in accordance with Comparative Example 1, and the copolyester-blowing agent concentrate of Example 1, in a ratio of 19:1, using a common cement mixer. The mixer could be left open during the mixing action, as it could not if blowing agent in powder form were being incorporated, so that a constant control of the mixing action was possible. The mixing could be terminated after 2 minutes.

This mixture was fabricated in a thermoplastic foam injection molding machine (TSG machine) made by Schloemann-Siemag, model Structomat ST 6000-170, using a quadruple board die, to form boards having thicknesses of 6 to 10 mm. The diameter D of the screw of the plasticizing unit was 80 mm, the screw length 20×D. The transfer piston had a diameter of 130 mm, and the transfer piston stroke amounted to 500 mm. The total weight of the boards was 1.5 kg, at a specific weight of 1.0 g/cm³. The heating band temperatures at the screw cylinder (from the input to the turnaround) were 200°–260°–260° C.; the heating band temperature of the turn-around connection was set at 240° C., and the two regulating zones of the transfer cylinder had a regulated temperature of 240° C. The temperature of the nozzle heating band was 250° C. The mass temperature resulting from this temperature schedule was 255° C. The screw speed during the plasticizing was 50 rpm, the back pressure applied during plasticization was 30 kp/cm². The peak pressure applied by the piston of the transfer cylinder was 185 kp/cm², and the injection time was 3.5 sec. The die temperature was maintained at 40° C. with a temperature control apparatus, and the cooling time was 120 sec.

A dust-free and odorless operation involving no residues was possible with the blowing agent concentrate of the invention. The structural foam boards had a smooth, uniform surface with the natural color of the molding composition used. On this machine it was possible, on account of the good activity of the blowing agent concentrate of the invention, to achieve, at an injection molding time of 1 second, a minimum molding density of 0.75 g/cm³ at a perfect filling out of the mold, which corresponds to a density reduction of about 51%.

Example 3

Unreinforced polytetramethylene terephthalate granules having a reduced viscosity of 1.3 dl/g and a specific weight of 1.31 g/cm³ was mixed with the blowing agent concentrate from Example 1 in a ratio of 19:1. The mixing apparatus was a square tinplate canister which was operated by hand with tumbling rotatory movements. On account of the easy miscibility of the blowing agent concentrate, sufficient mixing had been completed after only 20 revolutions. This mixture was fabricated in the solid injection molding machine described in Comparative Example 1, under the conditions specified therein, to form structural foam boards 10 mm thick. The specific weight of the boards was 0.85 g/cm³, which corresponded to a density reduction of 35%. The surfaces of the boards were smooth and uniform, and the natural color of the granules used was not altered.

EXAMPLE 4

Polytetramethylene terephthalate granules, reinforced with 30 wt.-% of glass fibers, and having a reduced viscosity of 1.5 dl/g, was mixed as described in Example 3 with the blowing agent concentrate from Example 1, and fabricated under the conditions described in Comparative Example 1 into structural foam boards 10 mm thick. Whereas, when the powdered blowing agents of Comparative Example 1 were used, nothing but boards with rough and unattractive surfaces could be produced on account of the poor flow characteristics of the melt due to its high viscosity, the boards had comparatively smooth surfaces.

EXAMPLE 5

Polyethylene terephthalate granules reinforced with 33 wt.-% of glass fibers and flameproofed (flameproofing agent: 10 wt.-% of cross-linked polytetrabromoxylylene glycol bisacrylate, 4 wt.-% of antimony trioxide) were mixed by the method described in Comparative Example 1 with the blowing agent concentrate of Example 1 in a ratio of 19:1. The specific weight was 1.73 g/cm³. This mixture was injection molded into structural foam boards 10 mm thick as described in Comparative Example 1. The heating band temperatures (from input to nozzle) had set values of 250°–270°–285°–295° C. This resulted in a mass temperature of 280° C. The die temperature was 120° C., the cooling time 220 seconds. At a specific weight of 1.04 g/cm³, the density reduction was 40%. The surfaces of the boards showed only slight structuring.

TABLE 1

| | Comparative Example 1 | Comparative Example 2 | Comparative Example 3 | Example 1 |
|---|---|---|---|---|
| Molding surface | 2 | 2 | 3 | 1 |
| Natural color | 1 | 1 | 2 | 1 |
| Pore structure | 2 | 2–3 | 2–3 | 1 |
| Blowing agent activity | 2 | 3 | 1–2 | 1 |
| Cooling time in seconds | 150 | 150 | 200 | 150 |

Scales of Judgment
Molding surface
1 = smooth, structure barely discernible.
2 = fair, structure clearly discernible.
3 = poor, strong structure lines.
Natural color
1 = unaltered
2 = altered
Pore structure
1 = finely cellular, uniform
2 = finely cellular, irregular
3 = coarsely cellular in part, with formation of voids
Blowing agent activity
1 = very good, high yield.
2 = satisfactory, reduced yield
3 = poor, low yield

TABLE 2

| | Test standard* | Unit | Comp. Ex. 1 | Comp. Ex. 2 | Comp. Ex. 3 | Ex. 1 |
|---|---|---|---|---|---|---|
| Spec. wt. | — | g/cm$^3$ | 1.05 | 1.1 | 1.0 | 1.0 |
| Ultimate tensile strength | DIN 53430 | N/mm$^2$ | 54 | 52 | 45 | 54 |
| Elongation at rupture | DIN 53430 | % | 1.8 | 1.5 | 1.2 | 2.0 |
| Tensional modulus of elasticity | DIN 53430 | N/mm$^2$ | 42 | 40 | 38 | 44 |
| Bending Strength | DIN 53423 | N/mm$^2$ | 91 | 88 | 82 | 90 |
| Flexural modulus of elasticity | DIN 53423 | N/mm$^2$ | 36 | 35 | 30 | 37 |
| Impact strength | DIN 53453 | kJ/m$^2$ | | | | |
| +23° C. | | | 12 | 14 | 8 | 20 |
| −40° C. | | | 10 | 10 | 5 | 17 |

*The tests were conducted on the basis of the stated DIN standards. The DIN standards are valid for solid parts, and prescribe a specimen thickness of 4 mm. The values given were determined on specimens which had been taken from structural foam boards 10 mm thick.

What is claimed is:

1. A blowing agent concentrate consisting of a chemical blowing agent and a thermoplastic vehicle therefor, said vehicle being a saturated polyester or copolyester having a crystalline melting point between 100° C. and 220° C. and a reduced viscosity between 0.4 dl/g and 1.6 dl/g, said chemical blowing agent being present in said blowing agent concentrate in an amount of at least 5 weight percent.

2. A blowing agent concentrate according to claim 1 wherein the polyester or copolyester has a crystalline melting point between 160° C. and 220° C.

3. A blowing agent concentrate according to claim 1 wherein at least 50 mole percent of the acid component of the polyester or copolyester is supplied by terephthalic acid or a polyester forming derivative thereof, the balance of the acid components being supplied by one or more other aromatic and/or saturated aliphatic dicarboxylic acid of 2 to 12 carbon atoms between the functional groups or their polyester-forming derivatives and the diol component of such polyester or copolyester is supplied by at least one aliphatic glycol having 2 to 12 carbon atoms.

4. A blowing agent according to claim 3 wherein the polyester or copolyester are derived, with respect to the diol or codiol component, from ethylene glycol, propanediol-1,2, propanediol-1,3, butanediol-1,3, butanediol-1,4, pentanediol-1,5, neopentyl glycol, hexanediol-1,6, octanediol-1,8 or cyclohexanedimethanol or a mixture thereof.

5. A blowing agent concentrate according to claim 3 wherein the thermoplastic composition is a copolyester in which the co-acid is supplied by isophthalic acid and/or sebacic acid and/or azelaic acid and/or succinic acid and/or glutaric acid and/or adipic acid and/or cyclohexanedicarboxylic acid or their polyester-forming derivatives.

6. A blowing agent concentrate according to claim 5 wherein 60 to 90 mole percent of the acid component of the copolyester is supplied by terephthalic acid or a polyester-forming derivative thereof, the balance being supplied by one or more co-acids or their respective polyester-forming derivatives.

7. A blowing agent concentrate according to claim 6 wherein at least a portion of the diol component of the copolyester is supplied by butanediol-1,4.

8. A blowing agent concentrate according to claim 7 wherein up to 100% of the diol component of the copolyester is supplied by butanediol-1,4.

9. A blowing agent concentrate according to claim 8 wherein up to 10 mole percent of the butanediol-1,4 is replaced by one or more other diols having 2 to 12 carbon atoms.

10. A blowing agent concentrate according to claim 6 wherein 65 to 75 mole percent of the acid component of the copolyester is supplied by terephthalic acid or its polyester-forming derivatives, the balance of the acid component being adipic acid and the diol component of the copolyester is supplied by butanediol-1,4.

11. A blowing agent concentrate according to claim 6 wherein 60 to 85 mole percent of the acid component of the copolyester is supplied by terephthalic or a polyester-forming derivative thereof and 15 to 40 mole percent of the acid component is supplied by isophthalic acid or a polyester-forming derivative thereof, the diol component being supplied by butanediol-1,4.

12. A blowing agent concentrate according to claim 6 wherein 60 to 85 mole percent of the acid component of the copolyester is supplied by terephthalic acid or a polyester-forming derivative thereof, the balance of the acid component being supplied at least in part by azelaic and/or adipic and/or sebacic acid or a polyester-forming derivative thereof, any balance to make up 100% being supplied by isophthalic acid or a polyester-forming derivative thereof.

13. A blowing agent concentrate according to claim 4 wherein 70 to 80 mole percent of the acid component of the copolyester is supplied by terephthalic acid or a polyester-forming derivative thereof, 20 to 30 mole percent of the acid component of the copolyester is supplied by one or more other aromatic and/or one or more aliphatic saturated co-acids having 2 to 12 carbon atoms between the two carboxyl groups and the diol component is supplied at least in part by ethylene glycol.

14. A blowing agent concentrate according to claim 13 wherein up to 100% of the diol component of the copolyester is supplied by ethylene glycol.

15. A blowing agent concentrate according to claim 14 wherein up to 10 mole percent of the ethylene glycol is replaced by one or more diols having 3 to 12 carbon atoms.

16. A blowing agent concentrate according to claim 3 wherein the polyesters are derived in respect to the diol component from hexanediol-1,6 and, with respect to the acid component from terephthalic acid.

17. A blowing agent concentrate according to claim 3 wherein the blowing agent is present in an amount of 5 to 50 weight percent based upon the weight of the blowing agent concentrate.

18. A blowing agent concentrate according to claim 3 wherein the copolyester is derived in respect of the acid components from 85% terephthalic acid and from 15% isophthalic acid and in respect of the diols from 50 Mol-% butanediol 1,4 and 50 Mol-% hexanediol 1,6.

19. A blowing agent concentrate according to claim 17 wherein the blowing agent is present in the blowing agent concentrate in an amount of 5 to 30 weight percent.

20. A blowing agent concentrate according to claim 19 wherein the blowing agent is present in the blowing agent concentrate in an amount of between 5 and 20 weight percent.

21. A blowing agent concentrate according to claim 17 wherein the blowing agent is 5-phenyl-tetrazol or 5-phthalimidotetrazol.

22. A blowing agent concentrate to claim 17 wherein the blowing agent has a decomposition temperature ranging from 120° to 260° C.

23. A blowing agent concentrate according to claim 22 wherein the blowing agent has a decomposition temperature in the range of 200° to 260° C.

24. In a process for forming a foamed article from polyalkyleneterephthalate polymer when said polymer is mixed with a blowing agent and thereafter introduced into a mold maintained under conditions to activate the blowing agent and form said polymer into a shape, the improvement which comprises introducing said blowing agent into said polymer in the form of a concentrate containing a thermoplastic composition as a vehicle for said blowing agent, said concentrate consisting essentially of a chemical blowing agent present in an amount of at least 5 weight percent, said thermoplastic vehicle being a saturated polyester or copolyester having a crystalline melting point between 100° C. and 220° C. and a reduced viscosity between 0.4 dl/g and 1.6 dl/g.

25. A process according to claim 24 wherein the blowing agent is present in the concentrate in an amount of 5 to 50 weight percent.

26. A process according to claim 25 wherein the blowing agent is present in the concentrate in an amount of 20 to 30 weight percent.

27. A process according to claim 25 wherein an amount of blowing agent concentrate is added to the polyalkyleneterephthalate such that the amount of blowing agent present in the complete mixture of blowing agent concentrate and polyalkyleneterephthalate is from 0.05 to about 10.0 weight percent.

28. A process according to claim 27 wherein the polyalkyleneterephthalate has a reduced viscosity of 0.7 to 2.3.

29. A process according to claim 25 wherein the polyalkyleneterephthalate is a polytetramethylene terephthalate.

30. A process according to claim 25 wherein the polyalkyleneterephthalate to which the blowing agent concentrate is added contains a filler, reinforcing element and/or flame proofing agent.

31. A process according to claim 30 wherein the polyalkyleneterephthalate to which the blowing agent concentrate is added contains glass fibers.

32. A blowing agent concentrate according to claim 1 wherein the blowing agent is present in an amount of 10 to 50 weight percent based upon the weight of the blowing agent concentrate.

33. A blowing agent concentrate according to claim 1 wherein said saturated polyester or copolyester has a glass transition temperature between −20° and +50° C.

34. A process according to claim 24 wherein said blowing agent is present in said blowing agent concentrate in an amount of 10 to 50 weight percent and the blowing agent concentrate is added to the polyalkyleneterephthalate such that the amount of blowing agent present in the completed mixture of blowing agent concentrate and polyalkyleneterephthalate is from 0.05 to about 10 weight percent.

35. A process according to claim 24 wherein said blowing agent is present in said blowing agent concentrate in an amount of 10 to 50 weight percent and the blowing agent concentrate is added to the polyalkyleneterephthalate such that the amount of blowing agent present in the completed mixture of blowing agent concentrate and polyalkyleneterephthalate is from 0.1 to 5.0 weight percent.

36. A process according to claim 35 wherein the glass transition temperature of the saturated polyester and/or copolyester is −20° to +50° C.

37. A blowing agent concentrate according to claim 17, wherein the concentrate is a granulate, having the blowing agent homogeneously imbedded in each granule particle of the thermoplastic vehicle.

* * * * *